US012043387B2

(12) United States Patent
Tian

(10) Patent No.: US 12,043,387 B2
(45) Date of Patent: Jul. 23, 2024

(54) UNMANNED AERIAL VEHICLE

(71) Applicant: Autoflight (Kunshan) Co., Ltd., Kunshan (CN)

(72) Inventor: Yu Tian, Hong Kong (CN)

(73) Assignee: AUTOFLIGHT (KUNSHAN) CO., LTD., Jiangsu Province (CN)

(*) Notice: Subject to any disclaimer, the term of this patent is extended or adjusted under 35 U.S.C. 154(b) by 0 days.

(21) Appl. No.: 18/149,078

(22) Filed: Dec. 31, 2022

(65) Prior Publication Data
US 2023/0257138 A1    Aug. 17, 2023

(51) Int. Cl.
| B64D 1/16 | (2006.01) |
| B64U 10/25 | (2023.01) |
| B64U 60/10 | (2023.01) |
| B64U 101/45 | (2023.01) |
| B64U 101/47 | (2023.01) |

(52) U.S. Cl.
CPC ............... *B64D 1/16* (2013.01); *B64U 10/25* (2023.01); *B64U 60/10* (2023.01); *B64U 2101/45* (2023.01); *B64U 2101/47* (2023.01)

(58) Field of Classification Search
CPC ... B64U 2101/47; B64U 2101/45; B64D 1/16
See application file for complete search history.

(56) References Cited

U.S. PATENT DOCUMENTS

| 3,423,053 | A | * | 1/1969 | Hawkhaw | ................ | B64D 1/16 116/215 |
| 3,790,109 | A | * | 2/1974 | Fischer | ................... | B64C 35/00 244/105 |
| 9,555,886 | B1 | * | 1/2017 | Hawass | ................ | A62C 3/0242 |
| 2014/0000917 | A1 | * | 1/2014 | Stupakis | ................ | B64U 20/70 169/53 |
| 2019/0127056 | A1 | * | 5/2019 | Weekes | .................. | B64U 30/10 |

* cited by examiner

*Primary Examiner* — Jessica B Wong
(74) *Attorney, Agent, or Firm* — WPAT LAW, P.C.; Anthony King

(57) ABSTRACT

An unmanned aerial vehicle having a fuselage, a water collection and emission equipment, wings, linear reinforcements, a landing gear and a vertical fin. The water collection and emission equipment has buoyancy units, a sealed cabin, a water pump and a water collection and emission pipe. The sealed cabin is detachably connected to the fuselage, and a compartment is arranged in the sealed cabin. The water pump is arranged in the compartment and the side wall of the sealed cabin has at least one concave part which is concave towards the direction of the inner cavity used for slowing down the swaying of water.

10 Claims, 2 Drawing Sheets

UNMANNED AERIAL VEHICLE

CROSS-REFERENCES

This application claims priority to China Patent No. 202123425440.6, filed on Dec. 31, 2021, which is hereby incorporated by reference in its entirety.

Although incorporated by reference in its entirety, no arguments or disclaimers made in the parent application apply to this divisional application. Any disclaimer that may have occurred during the prosecution of the above-referenced application(s) is hereby expressly rescinded. Consequently, the Patent Office is asked to review the new set of claims in view of all of the prior art of record and any search that the Office deems appropriate.

FIELD OF THE DISCLOSURE

The invention relates to the field of unmanned aerial vehicles, especially, relates to an unmanned aerial vehicle.

BACKGROUND OF THE INVENTION

Nowadays, unmanned aerial vehicles are slowly coming into view of common consumers, and unmanned aerial vehicles are applied to more and more various industries, such as transportation, patrol security tasks etc. However, most of existing unmanned aerial vehicles can only operate in the air, and can only take off and land on the ground. They cannot realize the functions of floating on a water area, taking off and landing or moving on the water area. Because the existing water unmanned aerial vehicles mainly use an open water area as a taking off and landing site and do not have the function of water collection. Therefore, when carrying out some special tasks, such as fulfilling rescue tasks above the fire site, current UAV uses only non-reusable fire-extinction equipment without water storage equipment installed, and the equipment cannot be reused. At present, most of the UAV cannot perform the rescue task of repeatedly collection water and emission water to extinguish the fire. In addition, the UAV will encounter in severe convective weather, the water flow in the sealed cabin will have a certain impact on the UAV, but the existing UAV does not have measure to slow down the occurrence of this situation. Therefore, it is necessary to provide an improvement to the existing UAV.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned needs. Although the present embodiments may obviate one or more of the above-mentioned needs, it should be understood that some aspects of the embodiments might not necessarily obviate them.

SUMMARY OF THE INVENTION

The purpose of this invention is to provide an unmanned aerial vehicle, which can reuse collection and emission equipment to collect water and discharge water, carrying out rescue tasks above the fire site with this equipment. Meanwhile, certain impact on the unmanned aerial vehicle caused by severe shaking of water flow in the sealed cabin due to the conditions of strong convection weather etc., can be mitigated by the unmanned aerial vehicle of this invention. It is also possible to float and move on the water surface of the water when fetching water, so that the unmanned aerial vehicle can be moved to a clean water source if the water is not clean.

To solve the above technical problem, the first aspect of the present invention provides an unmanned aerial vehicle for collection and emission water, including:
a fuselage;
wings, which is symmetrically arranged on two sides of the fuselage along the central axis of the fuselage;
linear reinforcements, the linear reinforcements in parallel to the central axis of the fuselage are arranged on two sides of the fuselage;
a landing gear, connected to the fuselage;
a vertical fin, the vertical fin is arranged at the end of the linear reinforcements of the unmanned aerial vehicle;
a water collection and emission equipment, comprising a sealed cabin connected to the fuselage;
the water collection and emission equipment further comprises buoyancy units connected to the fuselage;
the water collection and emission equipment further comprises a water pump arranged in the sealed cabin;
the water collection and emission equipment further comprises a water collection and emission pipe connected with the water pump;
the sealed cabin comprises at least one concave part at the side wall towards its length direction, which is used for slowing down the swaying of the water.

Comparing with the prior art, the embodiment in this invention has additionally been equipped with water collection and emission equipment for unmanned aerial vehicle. Water can be placed into unmanned aerial vehicle's sealed cabin by water collection and emission equipment. The unmanned aerial vehicle is also configured with the flotation pontoon and propellers connected to the pontoon, which can make unmanned aerial vehicle float on the water used for water extraction. The unmanned aerial vehicle can also realize the function of moving on the water used for water extraction by using the propellers connected to the flotation pontoons. In addition, since at least one concave part towards the inner cavity is additionally set in the sealed cabin, it can act as a pseudo wave board to slow down the severe shaking of water flow during the flight of unmanned aerial vehicle.

In an embodiment of the first aspect, the sealed cabin is removably connected to the fuselage.

In an embodiment of the first aspect, the sealed cabin is provided with a compartment, and the water pump is arranged inside the compartment of the sealed cabin.

In an embodiment of the first aspect, the buoyancy units comprise a first buoyancy unit placed beneath the landing gear; a second buoyancy unit and a third buoyancy unit, the second buoyancy unit and the third buoyancy unit being placed below the vertical fin respectively.

In an embodiment of the first aspect, the first, second and third buoyancy unit has a propeller detachably connected to one of their end faces respectively.

In an embodiment of the first aspect, the first, second and third buoyancy unit has a propeller detachably connected inside the unit respectively.

In an embodiment of the first aspect, the first, second and third buoyancy units are hollow structure.

In an embodiment of the first aspect, the sealed cabin is a watertight chamber construction.

In an embodiment of the first aspect, the cross-section of the concave part is rectangle.

In an embodiment of the first aspect, the quantity of concave part is five.

The invention can have one or more of the following beneficial effects:

The invention provides the reusage water collection and emission equipment for unmanned aerial vehicle additionally. Water can be placed into unmanned aerial vehicle's sealed cabin by water collection and emission equipment. The unmanned aerial vehicle is also configured with the flotation pontoon and propellers connected to the pontoon, which can make unmanned aerial vehicle float on the water used for water extraction. The unmanned aerial vehicle can also realize the function of moving on water used for water extraction by using the propellers connected to the flotation pontoons. In addition, since at least one concave part towards the inner cavity is additionally set in the sealed cabin, it can act as a fake wave-proof plate to slow down the severe shaking of water flow during the flight of unmanned aerial vehicle.

While this specification contains many specific implementation details, these should not be construed as limitations on the scope of any inventions or of what may be claimed, but rather as descriptions of features specific to particular implementations of particular inventions.

Certain features that are described in this specification in the context of separate implementations can also be implemented in combination in a single implementation. Conversely, various features that are described in the context of a single implementation can also be implemented in multiple implementations separately or in any suitable subcombination.

Although features may be described above and below as acting in certain combinations and even initially claimed as such, one or more features from a claimed combination can in some cases be excised from the combination, and the claimed combination may be directed to a subcombination or variation of a subcombination.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION

Figure 1:
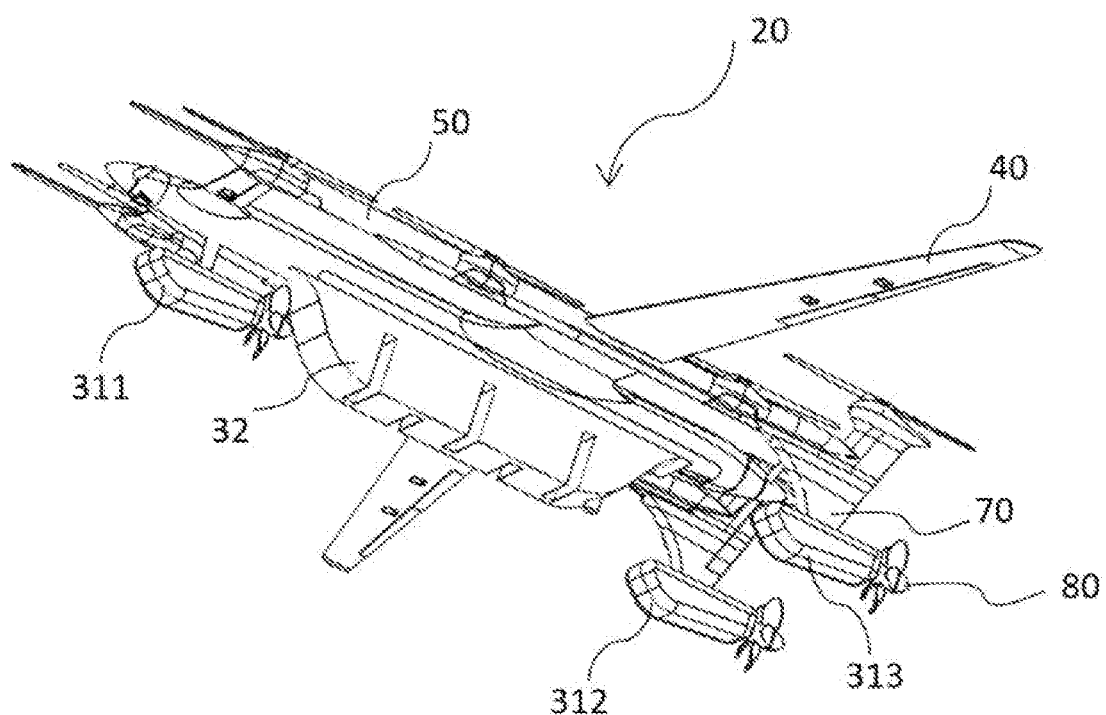
FIG. 1 shows a schematic structural diagram of the unmanned aerial vehicle of the present invention.

The different aspects of the various embodiments can now be better understood by turning to the following detailed description of the embodiments, which are presented as illustrated examples of the embodiments as defined in the claims. It is expressly understood that the embodiments as defined by the claims may be broader than the illustrated embodiments described below.

In order to resolve the technical problems states, the technical solutions adopted and the technical effects achieved by the invention more clear, the technical solutions of the embodiments of the invention will be further described in detail in combination with the attached drawings. Obviously, the described embodiments are only part of the embodiments of the invention, not all of them. Based on the embodiment of the invention, all other embodiments obtained by those skilled in the art without creative work belong to the protection scope of the invention.

The invention provides the following specific technical solutions:

An unmanned aerial vehicle, comprising: a fuselage 20; wings 40, are symmetrically arranged on two sides of the fuselage 20 along the central axis of the fuselage; linear reinforcements 50, the linear reinforcements 50 in parallel to the central axis of the fuselage are arranged on two sides of the fuselage 20; a landing gear, connected to the fuselage 20; a vertical fin 70, the vertical fin 70 is arranged at the end of the unmanned aerial vehicle's linear reinforcements 50; a water collection and emission equipment, comprising a sealed cabin 32 connected to the fuselage 20; the water collection and emission equipment further comprises buoyancy units connected to the fuselage 20; the water collection and emission equipment further comprises a water pump arranged in the sealed cabin 32; the water collection and emission equipment further comprises a water collection and emission pipe connected with the water pump; the sealed cabin 32 comprises at least one concave part 60 at the side wall towards its length direction, which is used for slowing down the swaying of the water. The cross-section of the concave part 60 is rectangle or circle. The sealed cabin 32 is removably connected to the fuselage 20. The sealed cabin 32 is provided with a compartment, and the water pump is arranged inside the compartment of the sealed cabin 32. The buoyancy units comprise a first buoyancy unit 311 placed beneath the landing gear; a second buoyancy unit 312 and a third buoyancy unit 313, the second buoyancy unit 312 and the third buoyancy unit 313 being placed below the vertical fin respectively 70. The first 311, second 312 and third 313 buoyancy unit has a propeller 80 detachably connected to one of their end faces respectively. The first 311, second 312 and third 313 buoyancy unit has a propeller 80 detachably connected inside the flotation pontoon respectively. The first 311, second 312 and third 313 buoyancy units are hollow structure. The sealed cabin 32 is a watertight chamber construction. The quantity of concave part 60 is five.

Figure 2:
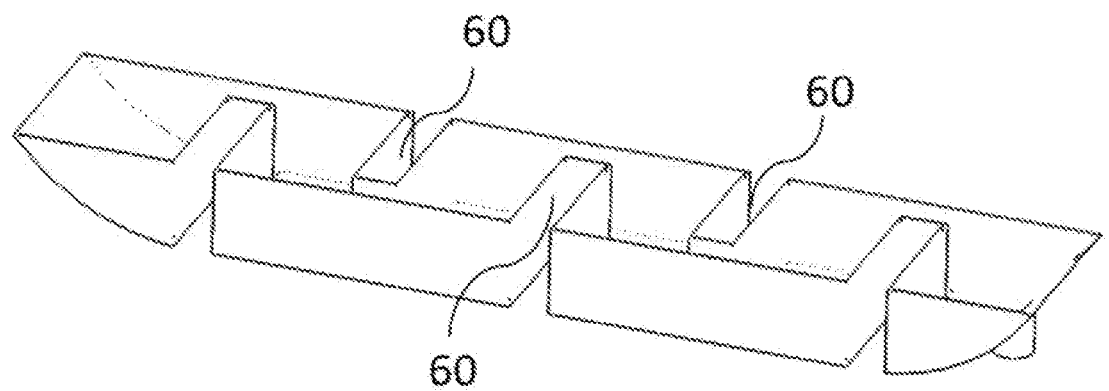
FIG. 2 shows the schematic structure of unmanned aerial vehicle's sealed cabin of the present invention.

As shown in FIGS. 1 and 2, the invention generally depicts the basic structure of an unmanned aerial vehicle.

On the one hand, the invention provides an unmanned aerial vehicle, which generally includes a fuselage 20 and a water collection and emission equipment, which is designed to enable the unmanned aerial vehicle to collect water in open waters and extinguish fire above corresponding fire sites.

In one embodiment, the unmanned aerial vehicle can have wings 40 symmetrically arranged at both sides of the fuselage 20, which provides the smooth flight for the unmanned aerial vehicle.

In addition, in one aspect of an embodiment, the unmanned aerial vehicle can also be provided with linear reinforcements 50. The linear reinforcement 50 in parallel to the central axis of the fuselage 20 are arranged on two sides of the fuselage 20. The cross-section of the linear reinforcements 50 present a certain shape, for example, it can be round, square, diamond or any other shapes. Moreover, the linear reinforcements 50 are made of materials with certain stiffness, such as carbon fiber, which can provide a high enough stiffness for the body of the unmanned aerial vehicle to resist the twisting torque caused by various factors in flight.

In addition, in another aspect of an embodiment, the unmanned aerial vehicle can also be provided with linear reinforcements 50, which has a certain curvature and is arranged on both sides of the unmanned aerial vehicle's fuselage 20. The cross-section of the linear reinforcements 50 presents a certain shape, for example, it can be round, square, diamond or any other shapes. Furthermore, the linear reinforcements 50 are made of materials with certain stiffness, such as carbon fiber, which can provide a high enough stiffness for the fuselage of the unmanned aerial vehicle to resist the twisting torque caused by various factors in flight.

Of course, the unmanned aerial vehicle can also comprise a landing gear, which is connected to the front end of the unmanned aerial vehicle's fuselage 20. The end or bottom of the landing gear can be connected with rollers to facilitate the unmanned aerial vehicle taxiing on the ground.

Similarly, the unmanned aerial vehicle can also have a vertical fin 70, which is set on the end part of linear reinforcement 50. The end of the vertical fin 70 can be connected with a base of the vertical fin 70, and the base of the vertical fin 70 can be connected with a roller to facilitate the unmanned aerial vehicle taxiing on the ground.

Another embodiment of another aspect of the invention provides an unmanned aerial vehicle with water collection and emission equipment. The equipment can specifically include a sealed cabin 32. The sealed cabin 32 can be a watertight structure, especially in case of severe weather, strong storm and extreme airflow, a good sealing structure can keep water in the sealing cabin 32 from leaking during the high altitude flight.

It can be understood that the side wall of the sealed cabin 32 in its length direction includes at least one concave part 60 towards the direction of the inner cabin. It is used to slow down the swaying of water. The cross-section of the concave part 60 can be rectangle or the cross-section of the concave part 60 can be a circle. The concave part 60 towards the direction of the inner cabin is additionally arranged on the side wall of the sealing cabin, which can act as a fake wave-proof plate. The function of the fake wave-proof plate is to slow down the severe shaking of the water flow during the flight of the unmanned aerial vehicle. The number of concave parts 60 can be five, two on one side and three on the opposite side.

Another embodiment of another aspect of the invention provides an unmanned aerial vehicle with water collection and emission equipment, which can specifically include a water pump (not shown in the figure).

Another embodiment of another aspect of the invention provides an unmanned aerial vehicle with a water collection and emission device, which can specifically include a water collection and emission pipe (not shown in the figure). The water collection and emission pipe has certain flexibility and can be inserted into the sealed cabin 32, so that the water pump can take water through the water collection and emission pipe and inject it into the sealed cabin 32. The water collection and emission pipe has two functions. On the one hand, when the unmanned aerial vehicle is floating and stopped on the water surface, the water collection and emission pipe inserted into the water surface to take water and put the water into the sealed cabin 32. When the water intake is completed, the unmanned aerial vehicle takes off from the water surface and flies to the fire site. After reaching the upper part of the fire site, it discharges the water through the water collection and emission pipe to extinguish fire and does rescue operations.

It can be understood that the sealed cabin 32 is provided with a quick connection device for quick connection to the unmanned aerial vehicle's fuselage 20 detachably. For example, the quick connection device can be a hook. There are several carrying parts under the unmanned aerial vehicle's fuselage 20. At the same time, the sealed cabin 32 is provided with several hook devices corresponding to the carrying parts one by one to realize the quick connection function between the sealed cabin 32 and the unmanned aerial vehicle's fuselage 20. The quick connection device can also be a clamping device. A number of protrusions are arranged under the unmanned aerial vehicle's fuselage 20, and a number of sunken parts corresponding to the protrusions are arranged on the sealed cabin 32, realizing the quick connection between the sealed cabin 32 and the unmanned aerial vehicle's fuselage 20. Of course, whether the sealed cabin 32 is connected to the unmanned aerial vehicle's fuselage 20 depends on the actual needs. For example, when the unmanned aerial vehicle needs to reach the fire area to carry out fire extinguishing rescue, it is necessary to connect the sealed cabin 32 to the unmanned aerial vehicle's fuselage 20, control the unmanned aerial vehicle to fly above the water area where the water needs to be taken, and then use buoyancy units to make the unmanned aerial vehicle float on the water surface, and then the water collection/emission pump starts to work. The water collection/emission pipe inserted into the water surface to pump water, and the water is loaded into the sealed cabin 32. After the water collection, the unmanned aerial vehicle takes off on the water surface and flies to the fire site. After reaching the upper part of the fire site, the water is discharged through the water collection/emission pipe for fire extinguishing rescue. Besides that, a compartment (not shown in the figure) can be set inside the sealed cabin 32, which has a good sealing performance to facilitate the placement of water pumps in the compartment. Because the compartment has a good sealing performance, the water pumps can operate safely and stably. The sealed cabin 32 can also be a watertight chamber structure. A good sealing structure can keep the water in the sealed cabin 32 from leaking during the high altitude flight of the unmanned aerial vehicle, especially in case of in bad weather, strong storms and extreme airflow.

Other embodiments of another aspect of the invention provide the unmanned aerial vehicles with water collection and emission equipment, which can specifically include a sealed cabin 32. The side wall of the sealing cabin 32 in its length direction includes at least one concave part 60 towards the direction of the inner cabin, which acts as a fake wave-proof plate to slow down the shaking of water flow. The cross-section of the concave part 60 is rectangle or the cross-section of the concave part 60 is circle. During the flight of the unmanned aerial vehicle, it will encounter unstable airflow or bad weather, which will bring turbulence to the unmanned aerial vehicle in flight. However, the turbulence of the unmanned aerial vehicle will cause severe shaking to the water flow in the sealed cabin 32. The shaking force generated by the water flow will act on the sealed cabin 32, causing more severe shaking to the unmanned aerial vehicle, therefore, the side wall of the sealed cabin 32 in its length direction includes at least one concave part 60 towards the inner cavity's direction, in order to balance the flow shaking force caused by the turbulence of the unmanned aerial vehicle.

An embodiment of another aspect of the invention provides an unmanned aerial vehicle with a water collection and emission device, which can specifically include buoyancy units.

In an embodiment provided in the present invention, the buoyancy unit comprises a first buoyancy unit 311, which is connected below the landing gear; The second buoyancy unit 312 and the third buoyancy unit 313 are respectively connected below the vertical fin 70. The flotation pontoon can provide buoyancy for the unmanned aerial vehicle to float on the water surface for water intake.

In another embodiment provided in the present invention, one end face of the first buoyancy unit 311, the second buoyancy unit 312 and the third buoyancy unit 313 can also be detachably connected with a propeller 80.

It should be understood that although the flotation pontoon can provide buoyancy for the unmanned aerial vehicle to float on the water surface for water intake, it cannot move the unmanned aerial vehicle over the water surface. By setting propeller 80 at the end surface of each flotation pontoon, when the water is not clean at one place, the unmanned aerial vehicle can sway to the area with cleaner water for water intake.

In other embodiments provided in this invention, the first buoyancy unit 311, the second buoyancy unit 312 and the third buoyancy unit 313 are detachably connected with a propeller 80 inside each pontoon. Certainly, each flotation pontoon can also adopt a hollow structure, so that the propeller 80 can be placed inside each flotation pontoon, which can provide more thrust for the unmanned aerial vehicle.

The above describes the implementation mode of the invention through specific embodiments. Those skilled in the art can easily understand the other advantages and effects of the invention from the contents disclosed in the description. The invention can also be implemented or applied in different specific embodiments, and various details in the specification can also be modified or changed based on different views and invention systems without departing from the purpose of the invention. It should be noted that the embodiments and features in the embodiments of the invention can be combined with each other without conflict.

With reference to the drawings, the present invention gives a detailed description of the embodiments in the invention, so that those skilled in the art to which the present invention belongs can easily implement it. The invention can be embodied in a variety of different forms, and is not limited to the embodiments described herein.

In order to clearly explain the invention, devices irrelevant to the description are omitted, and the same reference symbols are given to the same or similar constituent elements throughout the description.

In the entire description, when a device is said to be "connected" with another device, this includes not only the case of "direct connection", but also the case of "indirect connection" when other elements are placed between them. In addition, when a device "includes" certain constituent elements, as long as there is no record to the contrary, it does not exclude other constituent elements, but means that it can also include other constituent elements.

When a device is said to be "above" another device, it can be directly on the other device, but it can also be accompanied by other devices. When a device is "directly" on another device, it is not accompanied by other devices.

Although in some instances the terms first, second, and the like are used herein to describe various elements, these elements should not be limited by these terms. These terms are used only to distinguish one component from another. For example, the first interface and the second interface are described. Furthermore, as used herein, the singular forms "one", "a" and "the" are intended to include the plural forms as well, unless the context indicates otherwise. It should be further understood that the terms "comprising" and "including" indicate the existence of the described features, steps, operations, elements, components, items, categories, and/or groups, but do not exclude the existence, presence, or addition of one or more other features, steps, operations, elements, components, items, categories, and/or groups. The terms "or" and "and/or" as used herein are interpreted to be inclusive or to mean any one or any combination thereof. Therefore, "A, B or C" or "A, B and/or C" means "any of the following: A; B; C; A and B; A and C; B and C; A, B and C". Exceptions to this definition occur only when combinations of components, functions, steps, or operations are inherently mutually exclusive in some ways.

The technical terms used herein are only used to refer to specific embodiments and are not intended to limit the invention. The singular form used here also includes the plural form, as long as the statement does not clearly express the opposite meaning. The meaning of "including" used in the specification is to specify a particular characteristics, regions, integers, steps, operations, elements and/or components, not to exclude the existence or addition of other characteristics, regions, integers, steps, operations, elements and/or components.

The terms indicating relative space such as "down" and "up" can be used to easily explain the relationship between one device illustrated in the drawings and another device. This term refers not only in the sense referred to in the drawings, but also in other senses or operations of devices in use. For example, if the device in the drawing is turned over, a device that was described as "under" other devices is described as "on" other devices. Therefore, the so-called "under" exemplary terms all include upper and lower. The device can be rotated by 90° or other angles, and the terms representing relative space are also interpreted accordingly.

Although they are not defined differently, they include technical terms and scientific terms used herein. All terms have the same meaning as those generally understood by those skilled in the technical field to which the invention belongs. The terms defined in commonly used dictionaries are added with meanings consistent with relevant technical literature and current prompts. As long as they are not defined, they shall not be over interpreted in a desirable or very formulaic meanings.

The above embodiments only exemplify the principles and effects of the invention, and are not intended to limit the invention. Any person familiar with this technology can modify or change the above embodiments without violating the purpose and scope of this invention. Therefore, all equivalent modifications or changes made by a person with ordinary knowledge in the technical field without departing from the purpose and technical ideas disclosed in the invention shall still be covered by the claims of the invention.

The invention claimed is:
1. An unmanned aerial vehicle, comprising:
a fuselage (20);
a plurality of wings (40) that are symmetrically arranged on both sides of the fuselage (20) along a central axis of the fuselage;

a linear reinforcement (50) disposed in parallel to the central axis of the fuselage (20) and are arranged on both sides of the fuselage (20);

a landing gear connected to the fuselage (20);

a vertical fin (70), the vertical fin (70) is arranged at an end of said linear reinforcement (50) of the unmanned aerial vehicle;

a water collection and emission equipment including a sealed cabin (32) connected to the fuselage (20);

the water collection and emission equipment further includes a buoyancy unit connected to the fuselage (20);

a water pump arranged in the sealed cabin (32);

a water collection and emission pipe connected to the water pump; and wherein the sealed cabin (32) has at least one concave part (60) at a side wall to slow down a swaying of water contained therein.

2. The unmanned aerial vehicle according to claim 1, wherein the sealed cabin (32) is removably connected to the fuselage (20).

3. The unmanned aerial vehicle according to claim 2, wherein the sealed cabin (32) is provided with a compartment, and the water pump is arranged inside the compartment of the sealed cabin (32).

4. The unmanned aerial vehicle according to claim 1, wherein the buoyancy unit has a first buoyancy unit (311), a second buoyancy unit (312) and a third buoyancy unit (313); wherein the first buoyancy unit is disposed beneath the landing gear; wherein the second buoyancy unit (312) and the third buoyancy unit (313) are disposed below the vertical fin (70).

5. The unmanned aerial vehicle according to claim 4, wherein the first (311), second (312) and third (313) buoyancy units each has a propeller (80) detachably connected thereto.

6. The unmanned aerial vehicle according to claim 4, wherein the first (311), second (312) and third (313) buoyancy units each has a propeller (80) detachably connected therein on an inside of each of the first (311), second (312) and third (313) buoyancy units.

7. The unmanned aerial vehicle according to claim 4, wherein the first (311), second (312) and third (313) buoyancy units each has a hollow structure.

8. The unmanned aerial vehicle according to claim 1, wherein the sealed cabin (32) has a watertight chamber construction.

9. The unmanned aerial vehicle according to claim 1, wherein a cross-sectional shape of the concave part (60) is rectangle.

10. The unmanned aerial vehicle according to claim 9, wherein the sealed cabin (32) has at least five concave part (60) at the side wall to slow down a swaying of water contained therein.

* * * * *